United States Patent [19]

Tsay

[11] Patent Number: 4,565,109

[45] Date of Patent: Jan. 21, 1986

[54] INSTANTANEOUS DIRECTION CHANGING ROTATION MECHANISM

[76] Inventor: Chi-Chour Tsay, No. 31, Sung Shu, Jen-Shan Li, Ta-Hsi Chen, Tao-Yuan Hsien, Taiwan

[21] Appl. No.: 565,713

[22] Filed: Dec. 27, 1983

[51] Int. Cl.$^4$ ............................ F16H 5/06; F16H 5/76
[52] U.S. Cl. ........................................................ 74/780
[58] Field of Search .................. 74/70, 74, 125.5, 361, 74/376, 322, 780; 192/21

[56] References Cited

U.S. PATENT DOCUMENTS

| | | | |
|---|---|---|---|
| 632,886 | 9/1899 | Torbensen | 74/780 |
| 657,057 | 8/1900 | Blomstrom | 74/780 |
| 2,886,985 | 5/1959 | Meyer | 74/780 |
| 2,959,974 | 11/1960 | Emrick | 192/21 X |
| 3,048,050 | 8/1962 | Perryman | 74/322 X |
| 3,051,013 | 8/1962 | Zagar | 192/21 X |
| 4,150,590 | 4/1979 | Hurst | 192/21 X |
| 4,189,038 | 2/1980 | Hurst | 192/21 |

Primary Examiner—Craig R. Feinberg
Assistant Examiner—W. R. Wolfe
Attorney, Agent, or Firm—Cushman, Darby and Cushman

[57] ABSTRACT

An instantaneous direction changing rotation mechanism in which its driving shaft and driven shaft have coincident central lines, the driving shaft can be controlled for transmission via either a direction changing train of gear with negative train value or casing of gear for driving the driven shaft for rotation in either reverse or normal direction; the intermediate bevel gear of the train of gear has a spindle extending to the exterior of the casing of gear and fixed to a brake block so that the above control can be achieved by engaging or disengaging the brake block with a barke element; a movable ring is surrounding the upper part of the casing of gear so that while the rotation of the movable ring is restricted by the sensor means, there is an angular displacement against the casing of gear for disengaging or engaging the brake element with the brake block.

6 Claims, 4 Drawing Figures

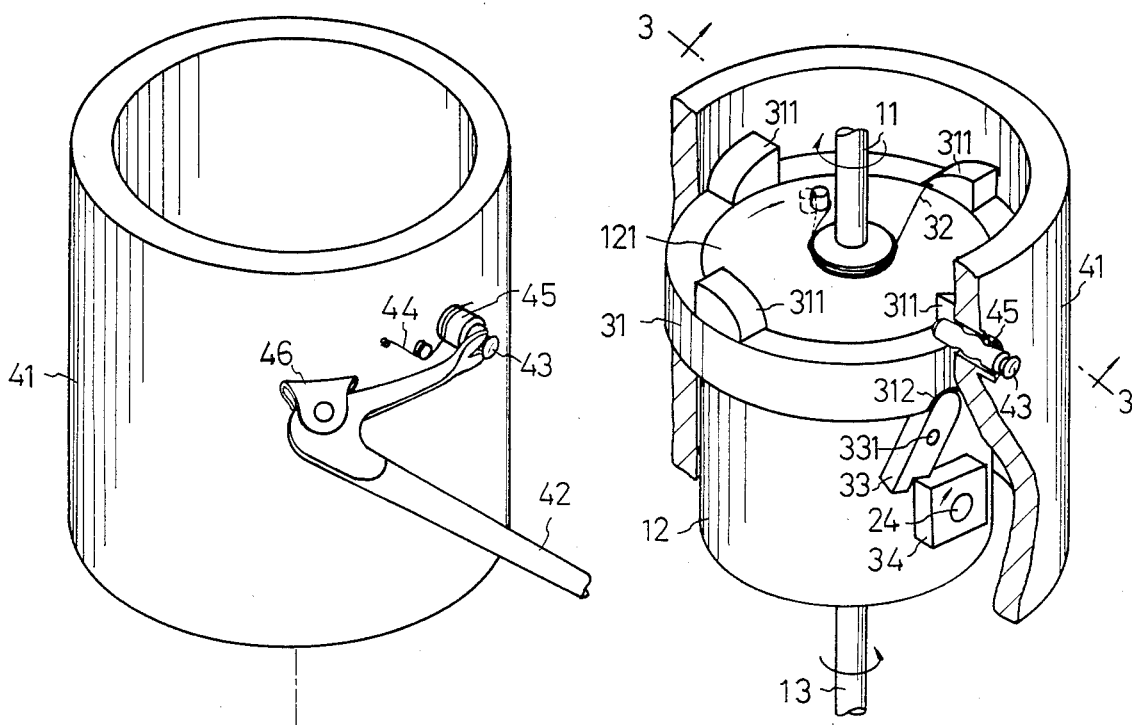
FIG. 2
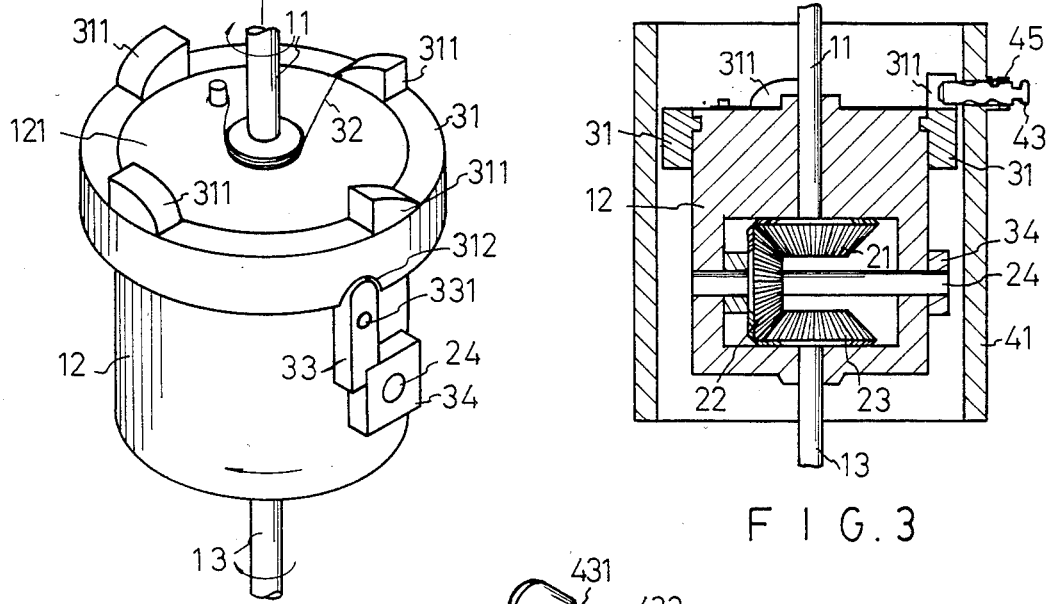
FIG. 1
FIG. 3
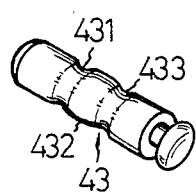
FIG. 4 ately 4,565,109

INSTANTANEOUS DIRECTION CHANGING ROTATION MECHANISM

BACKGROUND OF THE INVENTION

On a machine, a driving shaft is rotating in a direction continuously and a driven shaft can make rotation in the normal direction or reverse direction instantaneously upon receipt of signal without changing the rotation direction of the driving shaft, then, a direction changing rotation mechanism has to be installed between the driving shaft and the driven shaft. For example, a mechanism which has to carry fast reciprocating curvilinear or linear movement of unequal distance within an unfixed range without changing the rotation direction of motor.

SUMMARY OF THE INVENTION

The present invention provides an instantaneous direction changing rotation mechanism which is composed of a directional rotation means which can cause the driving shaft and the driven shaft to rotate in a same direction, a direction changing train of gear which can cause the driven shaft to rotate in reverse direction, a clutch means to control the direction changing of driven shaft, and a sensor means to receive signal for controlling the clutch means. It can change the rotating direction of a driven shaft by controlling the driving shaft via transmission through either casing of gear or direction changing gear. A major objective of the present invention is to provide a direction changing rotation mechanism which is simple in structure, practical, completed with permanent gear engagement and single driven shaft output for fast changing of rotation direction to be used in mechanical field comprehensively.

DETAILED DESCRIPTION

If a driving shaft is driving a driven shaft for rotation via a train of gear with negative train value, then the direction of rotation of the driven shaft is opposite to the rotation of the driving shaft. If a certain gear within the train of gear is fixed, and the central line of the driving shaft is coincident with that of the driven shaft, then the driving shaft can drive the whole train of gear together with the casing of gear for rotation so that the driven shaft is rotating in the same direction. Therefore, if a clutch means is equipped to control transmission from the driving shaft for either via the train of gear or the casing of gear, the rotating direction of the driven shaft shall be changed. If, in addition, a sensor means is equipped to control the above mentioned clutch means, the driven shaft can be controlled for rotation in normal direction or reverse direction in suitable time or according to different requirements. The above brief description represents the main principle for creating the present invention.

BRIEF DESCRIPTION OF DRAWINGS

FIG. 1 is an exploded perspective view of a preferred embodiment of the present invention.

FIG. 2 is a cross-section view of the preferred embodiment of the present invention upon removing a part of the external shell with the brake element disengaged with the brake block.

FIG. 3 is a cross-sectional view taken along line 3—3 of the FIG. 2 of looking in the direction of the arrows.

FIG. 4 is a detailed view of the stop element for the preferred embodiment of the present invention.

A detailed description of a preferred embodiment of the present invention is given as follows with reference to the attached drawings.

Please refer to the FIG. 1, which is an exploded perspective view of an embodiment of the present invention. As shown in the drawing, the central line of the driving shaft (11) is coincident with that of the driven shaft (13). Therefore, if the driven shaft (13) is driven by the driving shaft (11) via the casing of gear (12), then the driving shaft (11), casing of gear (12) and driven shaft (13) are rotating in the same direction—forming a directional rotation mechanism which can cause the driven shaft (13) to rotate at the same direction.

Please refer to the FIG. 2, a cross-section view of part of the embodiment of the present invention.

Please refer to the FIG. 3, a cross-sectional view taken along line 3—3 of FIG. 2 looking in the direction of the arrows The casing of gear (12) has a train of gear with negative train value in it so that the driving shaft (11) can drive the driven shaft for rotation in reverse direction via the direction changing train of gear. An end of the driving shaft (11) extending into the casing of gear (12) is fixed to the first bevel gear (21), an end of the driven shaft (13) extending into the casing of gear (12) is fixed to the second bevel gear (23). There is at least one intermediate bevel gear between the first bevel gear (21) and the second bevel gear (23). The intermediate bevel gear (22) engages the first bevel gear (21) and the second bevel gear (23) permanently. The spindle (24) of the intermediate bevel gear (23) has an end passing through the casing of gear (12) fixed to a brake block (34). Whenever the brake block (34) is rotatable, the driving shaft (11) can via transmission through the first bevel gear (21) and the intermediate bevel gear (22), drive the second bevel gear (23) and the driven shaft (13) for reverse rotation. Whenever the brake block (34) is fixed or prevented from rotation, the intermediate bevel gear (22) becomes unrotatable, the driving shaft (11) is forced to drive the whole train of gear and the casing of gear (12) for rotation in the same direction and thus, to cause the driven shaft (13) to rotate in the same direction.

Please refer to the FIG. 1. A movable ring (31) is surrounding the upper part of the casing of gear (12). The movable ring (31) can rotate around the casing of gear (12) for a small degree and then return to its original position corresponding to the casing of gear (12) by the action of a return spring (32). On the top of the movable ring (31) an even number of spaced blocks (311) are arranged. An end of the return spring (32) is fixed to a point on the end surface (121) of the casing of gear (12) while the other end is fixed to the movable ring (31) so that the spring is compressed by the angular displacement between the casing of gear (12) and the movable ring (31) and generates a return force while the external pressure is released.

The brake block (34) fixed to the spindle (24) extended from the intermediate bevel gear (22) is in the form of a rectangular block in any other shape which can be stopped easily. There is a brake element (33) on it for engagement and disengagement between the brake element (33) and the brake block (34) in order to control the transmission from the driving shaft (11) via either the casing of gear (12) and the direction changing train of gear. Since the brake element (33) is under the control of the movable ring (31), the clutch comprises the brake element (33) and brake block (34) as well as the movable ring (31) and return spring (32).

The above brake element (33) is attached to the casing of gear (12) by a pin (331) at its center so that the brake element (33) can rotate with the pin (331) as a center. The upper end of the brake element (33) is positioned within the recession (312) at the lower end of the movable ring (31). The recession is for preventing the brake block (34) for clockwise rotation. Therefore, when the movable ring (31) keeps a corresponding position with the casing of gear as shown in the FIG. 1, the driving shaft (11) can drive the driven shaft (13) for rotation in the same direction.

Please refer to the upper part of the FIG. 1 for the external shell (41), sensor element (42) and stop element (43). The sensor element (42) and the stop element (43) here constitute the sensor means of the present invention. The stop element (43) is passing through the external shell (41) into its interior with a shape as shown in the FIG. 4. It has two arch undercuts (431) and (433) and a guide arch (432) between them. As shown in the FIG. 1, a spring (44) is installed at the surface of the external shell (41). An end of the spring (44) is pressed above the first undercut (431) via the recession of the jacket (45). When the stop element (43) is moving inwards, the action of guide arch (432) causes the spring (44) to press the second undercut (433) for movement in reverse direction, and then it presses the first undercut (431) so that the stop element (43) can maintain a fixed displacement. Then, the sensor element (42), while contacting with other object or receiving an external force, with the stub (46) on the external shell (41) as a pivot, applies pushing or pulling force to the stop element (43) for displacement of the stop element (43).

Please refer to the FIG. 2, when the stop element (43) is moving inwards to a space between blocks (311) on the movable ring (31) to stop the movable ring (31) from rotation, the casing of gear (12) keeps rotation for a small degree so that there is an angular displacement between them. At the same time, the upper end of the brake element (33) is affected by the recession (312) of the movable ring (31) so that the brake element (33) is at declining position, the lower end of the brake element (33) is away from the brake block (34) so that the driving shaft (11) can drive the driven shaft (13) via transmission through the direction changing train of gear for reverse rotation.

When the stop element (43) is moving away from the blocks (311), the abovementioned return spring (32) reacts. It return the movable ring (31) to the original corresponding position with the casing of gear (12) and to cause the brake element (33) to rotate till its original position (as shown in the FIG. 1) in order to prevent the brake block (34) from further rotation so that the driven shaft (13) recovers its rotation in the same direction.

According to the above description, when the sensor means of the present invention is moving the stop element (43), the clutch means comprising the movable ring (31), return spring (32), brake element (33) and the brake block (34) is controlled so that the driving shaft (11) at continuous and low speed rotation can promptly change the direction of rotation of the driven shaft (13).

I claim:

1. A direction changing rotation mechanism comprising:
    a rotation means comprising a driving shaft and a driven shaft with coincident central lines and a casing of gear between the driving shaft and driven shaft for transmission of power from the driving shaft via the casing of gear to drive the driven shaft for rotation in the same direction;
    a direction changing train of gear within the casing of gear with negative train value for transmission of power from the driving shaft to drive the driven shaft for rotation in reverse direction;
    a clutch means comprising a movable ring attached to the circumference of the casing of gear which can generate angular displacement against the casing of gear, a return spring for the movable ring, a brake block extended from the train of gear to the circumference of the casing of gear and a brake element on the casing of gear to control the brake block in order to control the driving shaft to transmit via either the casing of gear or the train of gear; and a sensor means comprising a sensor element and a stop element fixed to an external shell which, by reaction of the sensor element contacting another object, a force is applied to the stop element for displacement in order to control the rotation of the movable ring and then to alter the engagement condition between the brake block and brake element of the clutch means for controling the direction of rotation of the driven shaft indirectly.

2. A direction changing rotation mechanism as claimed in claim 1, wherein the direction changing train of gear is composed of a first bevel gear which is fixed to an end of the driving shaft within the casing of gear, a second bevel gear fixed to an end of the driven shaft within the casing of gear and at least an intermediate bevel gear between the first and the second bevel gears and engaged with them in order to transmit from the first bevel gear via the intermediate bevel gear to the second bevel gear for rotation in reverse direction.

3. A direction changing rotation mechanism as claimed in claim 1, wherein an end of a spindle of the intermediate bevel gear is extending through the casing of gear and fixed to the brake block so that while the brake block is restricted by the brake element, the driving shaft is not able to transmit through the train of gear but to rotate the whole casing of gear.

4. A direction changing rotation mechanism as claimed in claim 1, wherein there are an even number of spaced blocks on the movable ring of the clutch means so that its rotation is stopped while the stop element of the sensor means is within the space between the blocks and an angular displacement is formed after the movable ring is rotated in a small degree.

5. A direction changing rotation mechanism as claimed in claim 1, wherein the brake element of the clutch means is attached to the casing of gear by a pin at its center so that the brake element can rotate with the pin as a pivot and another end of the brake element is positioned within a recession of the movable ring while its other end keeps contact with the brake block and by the angular displacement between the movable ring and the casing of gear the former end of the brake element is restricted by the movable ring so that the brake element is at declining condition and the brake block is away from it and this the latter end can rotate freely.

6. A direction changing rotation mechanism as claimed in claim 1, wherein the return spring of the clutch means has an end fixed to the surface of the casing of gear and another end fixed to the movable ring in order to receive force while there is an angular displacement between the casing of gear and the movable ring so that while the stop element is away from the moving ring the movable ring can return to its original position corresponding to the casing of gear.

* * * * *